Figure 1A:
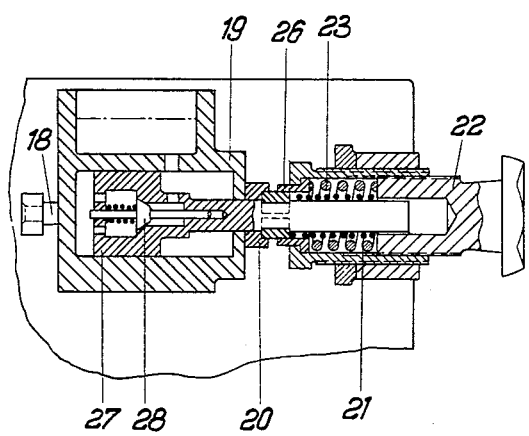

May 29, 1956  H. GASTROW  2,747,516
RADIAL MACHINE
Filed Aug. 16, 1952  2 Sheets-Sheet 1
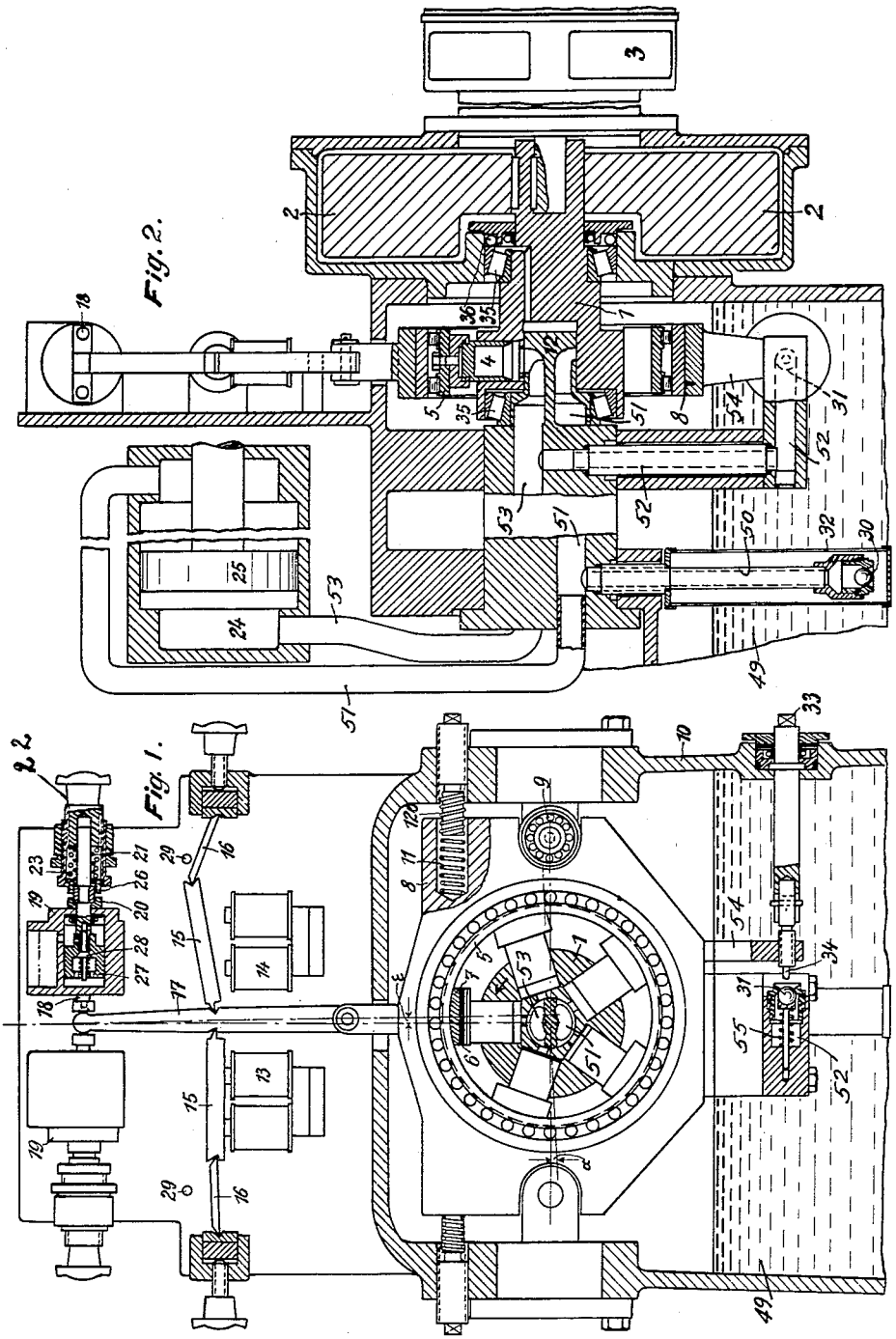
Inventor:
Hans GASTROW May 29, 1956 H. GASTROW 2,747,516
RADIAL MACHINE Filed Aug. 16, 1952 2 Sheets-Sheet 2

Inventor:
Hans GASTROW

United States Patent Office 2,747,516
Patented May 29, 1956

2,747,516

RADIAL MACHINE

Hans Gastrow, Berlin-Lichterfelde, Germany

Application August 16, 1952, Serial No. 304,739

Claims priority, application Germany August 20, 1951

4 Claims. (Cl. 103—161)

This invention relates to radial machines, and more particularly to a radial pump or motor for use in hydraulic transmissions and for the drive of presses and apparatus having reciprocating pistons.

An object of the invention is to provide a pump of above described type wherein losses caused by leakage and friction are reduced to a minimum.

Another object of the invention is to provide a pump the operation of which may be readily reversed from delivery in one direction to delivery in the opposite direction, without application of great forces.

A further object of the invention is to provide a pump wherein the maximum delivery output at a given low pressure and the delivery output at an adjustable maximum pressure are individually adjustable in both directions of delivery.

Another object of the invention is to provide a pump wherein upon passing of the adjusted maximum pressure the quantity delivered by the pump is reduced to that amount which is required for making up for the losses by leakage of the pump and of cylinders or other hydraulic apparatus connected with the pump.

A further object of the invention is to provide a pump being capable of balancing sudden increases of load in a similar manner as obtainable by a hydraulic accumulator, so that in spite of sudden increases of load, which may occur, an electromotor directly driving the pump is subject to a substantially uniform load.

For example, sudden increases of load occur, during the operation of all types of presses and die-casting machines. During the operation of a press, at first the platen is displaced through a comparatively large distance under a very small load, whereupon the working stroke proper takes place through a small distance under a high load. During the operation of a die-casting machine equipped with a hydraulic piston for closing and locking the mold and for causing the injection, the conditions are as follows: At first the hydraulic driving piston closes the mold at a speed of approximately 10 cm./sec. (centimeters/second). If a force of 100 kg. (kilograms) is needed for overcoming the frictional resistances of the closing movement, an input of 2000 cmkg. (centimeter-kilograms) or 20 mkg. (meterkilograms) is required when the closing stroke amounts to 200 cm. (centimeters).

In a machine wherein, for example, the output amounts to 100 ccm. (cubic centimeters) per injection and a specific pressure of 1000 atü. (atmospheres excess pressure) acts on the injecting piston, the injection requires an input of 100,000 cmkg., i. e., 50-times the input required for the closing of the mold. If the injection shall take place within 1.5 sec., an input of 1000 mkg. (meterkilograms) per 1.5 sec., i. e. approximately 8.9 P. S. (horsepower) are required, without accumulation of energy. On the assumption that an injection-cycle last 20 secs. and that an ideal accumulation of energy prevails, an input of 1020 mkg. per 20 sec. would be necessary. This corresponds to an input of .68 P. S. Although a leveling of the sudden increases of load may be obtained in a hydraulic accumulator, the total efficiency of the drive, however, is reduced to such an extent owing to the throttling required by the limitation of the speed of the piston, that, in spite of the accumulation of energy, the mean power absorbed amounts to a multiple of the calculated theoretical average output.

In a hydraulic pump according to the invention, the accumulation of energy is obtained by the arrangement of a flywheel between the driving motor and the hydraulic pump. The flywheel is of such a dimension that, at a decrease in the number of revolutions of about 10%, i. e. a loss of speed requiring delivery of the permissible maximum torque by the driving three-phase motor, the flywheel has an output capable of delivering almost the entire input of 1000 mkg. required for the injection. As the injection lasts 1.5 sec., 18.5 sec. are available for reloading the flywheel to the normal number of revolutions. Thus it is sufficient to give the motor, for thermical reasons, a dimension approximately twice the theoretically required dimension, i. e. approximately 1.4 P. S.

Figure 1B:
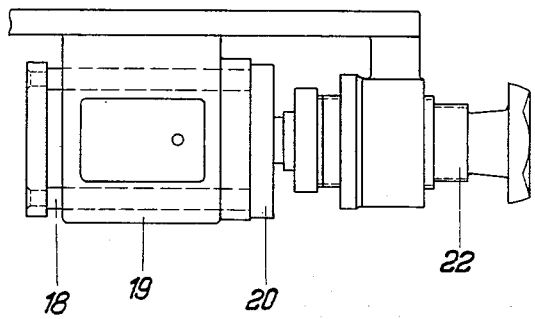
Figure 3:
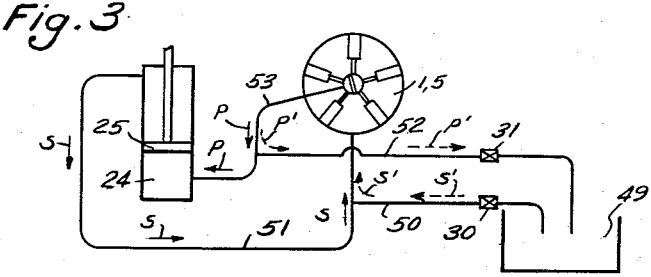

Other objects and structural details of the invention will be apparent from the following description when made in conjunction with the accompanying drawings forming part of this specification, wherein:

Fig. 1 is a vertical sectional view of a radial pump according to the invention, mounted in the bed of a die-casting machine, the electro-magnetic reversing device for changing a forward movement of the hydraulic piston to a backward movement and vice-versa being arranged above the pump, Figs. 1a and 1b are a vertical sectional view and a top plan view respectively of a detail of the pump, Fig. 2 is a longitudinal sectional view of the controlling device, the pump and the working cylinder for the closing of the mold and for the injection, and Fig. 3 is a plumbing diagram of the fluid paths.

The radial type or star-like cylinder block 1 having five cylinder bores receiving pistons 4 is driven by the electromotor 3 at a speed of 1500 revolutions per min.; a flywheel 2 is keyed to said cylinder block 1. The pistons 4 are hollow so as to reduce the centrifugal forces. The hollow embodiment of the pistons 4 has the additional advantage of a better sealing between the pistons and the cylinder walls, as the high inner pressure of approximately 100 atü. acting on the relatively thin walls of the pistons causes an elastic deformation of the latter, thus pressing same tightly against the walls of the cylinders. When a piston has a diameter of 4 cm., each piston is pressed against its abutting surface with a force of 1250 kg. at a pressure of 100 atü. The centrifugal forces of the mass of the piston and of the oil filling have to be added. If the ring 5, arranged in a manner known per se eccentrically to the cylinder block 1 and operatively engaged with rollers of a roller bearing inserted into an aperture of a bearing body 8 shall rotate at the same constant speed as the cylinder block 1, intermediate members are necessary between the pistons and the ring which render possible a relative movement between the pistons and the ring corresponding to the eccentricity. This relative movement must take place under a pressure of 1250 kg. per piston. A sliding movement under such a high pressure while the cylinder block 1 rotates at 1400 revolutions per min., thus causes a relatively high loss of efficiency contributing to a great extent to the heating of the oil. According to the invention the frictional losses of said relative movement are reduced to a minimum by the arrangement of plane anti-friction bearings or roller bearings comprising the rollers 6. Furthermore, the pistons 4 are provided with dovetail-shaped recesses slidably engaged by thrust elements 7 movable in the direction of said relative movement. Said dovetail engagement is needed only for the starting and stopping of the pump.

The centrifugal forces of the pistons and the pressing thereof against the thrust elements 7 by the pressure of the liquid are so high at a speed of 1400 R. P. M., that the torque is transmitted between the cylinder block 1 and the ring 5 only by the rollers 6 of the plane roller bearings. The thrust elements 7 are rigidly secured to the ring 5 by screws. As mentioned above, the ring 5 is rotatably arranged in the bearing body 8 through the medium of rollers. Said body or shift ring 8 is displaceable in horizontal direction, so that any desired positive or negative adjustment of the eccentricity of the radial pump may be obtained by a horizontal displacement of said body 8. In the hitherto known radial pumps having a horizontally displaceable shift ring the latter is supported by sliding bearings permitting a displacement in horizontal direction. However, as such sliding bearings are subjected to extremely high forces at maximum pressure of the pump, the friction thus caused requires the application of relatively high forces for a change in the eccentricity. Therefore, hitherto known radial pumps cannot be equipped with electromagnetic means for the performance of a change in the eccentricity as desired for a reversal of the direction of delivery of the pump. According to the invention, however, anti-friction bearings or roller bearings are also used for axial displacement of the bearing body 8. The bearing body 8 is horizontally displaceably mounted on roller bearings 9 in the bed 10 of the machine.

In the neutral position of the shift ring 8 (eccentricity zero) there are no forces which may cause a horizontal displacement of the bearing body 8, if each of the five pistons 4 has the same weight. As soon as however an eccentricity $\epsilon$ exists between the cylinder block 1 and the bearing block 8, a force component being proportional to the eccentricity $\epsilon$ acts in horizontal direction xxx from zero on the bearing body 8. If it is desired to displace the bearing body 8 without application of force, it is necessary to compensate said force component caused by the centrifugal action of the pistons. As said force is proportional to $\epsilon$ at a constant speed of rotation, it is possible to compensate same by means of a spring 11 acting with a force likewise proportional to $\epsilon$. If, as shown in Fig. 1, the springs 11 are adjustably arranged at both sides of the bearing body or shift ring 8, the neutral position of the shift ring 8 may thus be readily adjusted when the cylinder block 1 is at a standstill. As it is necessary to adjust the coefficient of the spring, i. e. the increase of force of the spring per each millimeter of stroke, in conformity with the force acting on the bearing body 8 due to the eccentricity of the pistons, preferably said springs are of a type having a variable spring coefficient. This feature is obtained in the embodiment according to Fig. 1 by the fact that each of the springs is screwed more or less on a bolt 120 having a thread corresponding to the pitch of the spring, whereby the resilient action of more or less windings of the spring may be excluded. Thus it is possible to displace horizontally the bearing body 8 without application of force, disregarding the negligible bearing friction of the roller bearings 9.

It is known in the art to support the shift ring in one direction of the displacement for change of eccentricity by means of an adjustable spring which in turn is subjected to the counter-action of a pilot piston exposed to the forces of the compressed liquid, said piston acting on said spring so as to compress the same, i. e. the pilot piston, when under pressure, tends to move the shift ring toward its neutral position. Thus the eccentricity and, consequently, the delivery output of the pump are reduced when the pressure is increased. This automatic control of the delivery output of the pump in dependence on the fluid pressure, however, may be carried out only in one direction of $\epsilon$. If, in addition thereto the direction of delivery shall be reversed, as desired in most cases, the reversal of the direction of pressure on the working piston or hydraulic motor driven by the pump can be carried out only by reversing means (rotary valves or slide valves). Therefore, according to the invention, the force acting in the direction of eccentricity "zero" is not generated by pistons under the action of liquid under pressure; said force, however, is generated by an angle $\alpha$ between the horizontal axis of the bearing body 8 and the central axis of the partitions between pressure bores and suction bores of the stationary controlling shaft or pintle 12. This angle $\alpha$ results in a force component acting on the bearing body 8 in the direction of the neutral-position of the shift ring and being proportional to the pressure of the liquid, so that it has the same effect as the pistons acted upon by the compressed liquid in hitherto customary machines. Besides this fact, however, the direction of said force component is reversed when the eccentricity $\epsilon$ is displaced to the opposite side, i. e. when the direction of delivery of the pump is reversed. Thus, in view of these arrangements, it is possible to obtain by a displacement of the eccentricity and beyond the zero-position first a reversal of the direction of delivery and second, in both directions of delivery, the creation of a force acting on the bearing body 8 in the direction of the eccentricity "zero" and being proportional to the pressure of the liquid, as required for an automatic control of the delivery output in dependence on the pressure.

If the pump operates under high pressure in one direction of delivery when the working piston subject to the action of liquid delivered by the pump reaches its end position, upon reversal of the direction of delivery the counter-force on the driven working piston is very small as, at least at the beginning of the return stroke, the piston moves idle. Thus, only very small forces are required for displacing the bearing body 8 for opposite direction of delivery. Therefore, relatively small electromagnets may be used advantageously for the displacement of the bearing body 8 in direction of opposite eccentricity, whereby the reversing of the working piston may be simplified to a great extent. If, as shown in Fig. 1, the reversing mechanism is equipped with two electromagnets 13 and 14, the armature of which is in the shape of an adjustable toggle lever 15, 16 having knife edge bearings, the friction of the bearings of the toggle levers is also very small. Furthermore, the maximum value of the displacement of eccentricity in both directions of delivery may be adjusted by the adjustability of the toggle levers. The toggle levers act on the center of a lever 17 pivotally connected at one of its ends with the bearing body 8, while the other end of said lever 17 is in abutting engagement with bars 20 through the medium of two shiftable rods 18 passing through the casing of an oil dampening device or dash pot 19. The bars 20 are under the action of a low-pressure counter-spring 21 and, upon performance of a stroke adjustable by the screw connection 22, they come under the adjustable action of the counter-springs 23. As long as the counter-pressure of the working cylinder 24 is small, i. e. during idling movements of the piston 25, the tension of the springs 21 is high enough to prevent the rods 18 from a displacement. When the oil pressure is increased, the force component acting on the bearing body 8 in the direction of eccentricity "zero" preponderates as soon as an oil pressure determined by the tension of the spring 21 is reached, so that the eccentricity and, consequently, the delivery output are reduced, until the bar 20 presses through the medium of the bushing 26 against the stronger pre-loaded springs 23. Then, the pump continues to operate with a delivery output corresponding to the adjustment of the screw connection 22, until the oil pressure reaches a value corresponding to the adjusted tension of the springs 23. When the oil pressure exceeds this value, the spring 23 yields, so that the eccentricity of the pump is reduced to a value which is given by the losses of leakage at the set maximum pressure when the working piston 25 is stopped. Thus, in an embodiment according to the invention it is possible to adjust in both directions of delivery a maximum delivery output at a desired low pressure, the quantity of delivery at an adjustable maximum pressure and an automatic changing over to a delivery output corresponding to the losses of leakage.

The electromagnets do not have to overcome forces of tensioned springs for the reversal to opposite direction of delivery. Said forces start only to act after the members of the toggle levers 15, 16 are in an aligned position when the armatures are attracted. Upon release of the armature, while the pressure of the pump is at a maximum, the force of the tensioned springs 21 and 23 acts on the lever 17. In order to avoid a shock-like sudden upward movement of the armature upon deenergization of the electromagnet, the return stroke of the lever 17 and the release of the springs 21, 23 are dampened by an oil dampening device; the tensioning of the springs, however, takes place without a dampening action thereon, so that the reversing of the delivery output takes place without delay. Said effect of the oil dampening device is obtained by the arrangement of a valve 28 within the dampening piston 27, said valve coming into closing position, upon movement of the piston in the direction causing a release of the springs 21, 23, and coming into opening position, upon movement of the piston in the direction causing a tensioning of the springs. The fit of the piston is such, that the release of the springs takes place at a time when a shock-like action on the toggle levers 15, 16 cannot occur. Furthermore, stops 29 are arranged for cooperation with the toggle levers 15, 16 so as to prevent the knife edge bearings of said toggle levers from disengagement.

The filling chambers of the working cylinder 24 are of different size owing to the piston rod passing through one of same. The amount of filling is smaller at the piston rod side of the working cylinder than at the opposite side thereof. If the main working direction of the piston is in the direction of the piston rod, i. e. if in said direction the working stroke proper takes place, it is necessary to supply, during the working stroke, to the pump from the oil reservoir 49 through a suction line an amount of oil corresponding to the difference between the working chambers. On the other hand, during the return movement of the piston the amount of oil corresponding to said difference must be able to return from the working chamber 24 to the oil reservoir. This feature is obtained by the arrangement of a suction-valve 30 in the line 50 connected with the suction line 51, connecting in turn the cylinders in the lower portion of the rotatable block 1 of the rotary pump (see Figs. 1 and 2) with the piston rod side of the working cylinder, and by the arrangement of a valve 31 in the line 52 connected with the pressure line 53, connecting in turn the cylinders in the upper portions of the rotatable block 1 of the rotary pump with the working chamber 24 of the working cylinder, said last mentioned valve 31 being controlled by the movements of the bearing body 8. As shown in Figs. 1 and 2, said bearing body 8 has an extension 54 holding a rod 34. Said rod 34 is adjustable in the direction of its longitudinal axis by means of an adjusting device generally indicated by 33. When during a rocking movement of the bearing body 8 for displacement of the eccentricity ε the rod 34 comes into engagement with the valve 31, the rod 34 causes an opening of the valve 31 against the action of the spring 55. Upon a subsequent return movement of the bearing body 8 the valve 31 is automatically closed by means of the spring 55 upon disengagement of the rod 34 from the valve 31. Then, the position shown in Fig. 1 is resumed.

According to the embodiment shown in Figs. 1 and 2 the pump acts on the working chamber 24 of the working cylinder. The piston rod side of the working cylinder is connected with the suction-valve 30. The amount of oil needed for filling the working chamber 24 is received from the oil reservoir 49 through the suction valve 30 and line 50 communicating with line 51. The valve 31 remains in closing position by the action of its spring 55. Preferably, a sieve 32 is arranged for preventing impurities from penetrating into the valve 30. When the direction of delivery is reversed by deenergizing the electromagnet 13 and energizing the electromagnet 14, i. e. when the eccentricity is displaced to the side opposite the side shown in Fig. 1, the rod 34 being adjustable from outside the oil reservoir 49 by the device 33 presses on the valve 31 for holding same in open position as soon as the zero-position of the eccentricity is passed. Thus, the excess amount of oil flowing from the working chamber 24 may return into the oil reservoir 49.

The fluid paths are indicated in Fig. 3 by the arrows S and P. The arrows S' indicate the path of the fluid for filling the working chamber 24 with oil from the oil reservoir 49 through the rotary pump 1 and the arrows P' indicate the path of the excess amount of oil discharged into the oil reservoir 49 upon opening of the valve 31.

The pressure medium is supplied to the bores of the cylinder block through passages of the stationary shaft or pintle 12 the diameter and the length of which are as small as possible so as to avoid unnecessary frictional losses. The clearance must be as small as possible for the elimination of oil losses. It is known in the art to absorb the very high bearing pressures at this point by roller bearings 35 so as to relieve the shaft 12. However, roller bearings are also subject to wear and tear whereby an additional load acts on the bearing shaft 12 thus causing increased frictional losses. Therefore, according to the invention said additional bearings 35 of the cylinder block 1 are in the shape of conical roller bearings which are axially held under tension by a spiral spring 36 inserted into an annular space, so that the roller bearings may rotate without play.

I have described a preferred embodiment of my invention, but it is understood that this disclosure is for the purpose of illustration and that various omissions or changes in shape, proportion and arrangement of parts, as well as the substitution of equivalent elements for those herein shown and described may be made without departing from the spirit and scope of the invention as set forth in the appended claims.

What I claim is:

1. A radial piston pump or motor comprising in combination: inlet and outlet conduit means, a cylinder barrel provided with a plurality of radially arranged cylinders, a plurality of pistons mounted in said cylinders for movement relative thereto and for cooperation with said inlet and outlet conduit means, shiftable guide ring means surrounding said pistons and movable selectively from a position concentric to said barrel to a position eccentric thereto and vice versa, slide block means surrounding said shiftable guide ring means and operable to shift the latter, lever means operatively connected to said shift ring means, toggle means provided with a knife edge portion engaging said lever means, electromagnetic means arranged for actuating said toggle means, first spring means acting upon said lever means to maintain the latter in a position corresponding to a desired maximum delivery position of said shift ring means, said first spring means being arranged to yield in response to a predetermined pressure of said pump, second spring means operable in response to the yielding of said first spring means to act upon said lever means to maintain said shift ring means in a position for reduced delivery, said second spring means being arranged to yield in response to a second predetermined pressure of said pump to thereby allow said shift ring means to move into substantially zero position.

2. A radial piston pump or motor according to claim 1, which includes means for adjusting at least one of said spring means.

3. A radial piston pump or motor according to claim 1, which includes adjusting means for adjusitng said toggle means.

4. A radial piston pump or motor comprising in combination: inlet and outlet conduit means, a cylinder barrel provided with a plurality of radially arranged cylinders, a plurality of pistons mounted in said cylinders for movement relative thereto and arranged for cooperation with said inlet and outlet conduit means, shiftable guide ring means surrounding said pistons and movable from a position concentric to said cylinder barrel into a position eccentric thereto and vice versa, shift ring means surrounding said guide ring means for moving the same, valve means communicating with one of said conduit means, and actuating means carried by said shift ring means and operable in response to a predetermined movement thereof to open said valve means.

References Cited in the file of this patent

UNITED STATES PATENTS

| | | |
|---|---|---|
| 1,946,439 | Heller | Feb. 6, 1934 |
| 1,965,937 | Ferris | July 10, 1934 |
| 2,063,464 | Schindler | Dec. 8, 1936 |
| 2,292,181 | Tucker | Aug. 4, 1942 |
| 2,328,717 | Glasner | Sept. 7, 1943 |
| 2,406,138 | Ferris et al. | Aug. 20, 1946 |
| 2,429,011 | Wylie | Oct. 14, 1947 |
| 2,550,966 | Buchanan | May 1, 1951 |
| 2,552,449 | Overbeke | May 8, 1951 |